(12) United States Patent
Alfermann et al.

(10) Patent No.: US 9,583,983 B2
(45) Date of Patent: Feb. 28, 2017

(54) ELECTRIC MOTOR ASSEMBLY AND METHOD

(71) Applicant: GM GLOBAL TECHNOLOGY OPERATIONS LLC, Detroit, MI (US)

(72) Inventors: Timothy J. Alfermann, Carmel, IN (US); Edward L. Kaiser, Orion, MI (US); Ryan Van Tiem, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 800 days.

(21) Appl. No.: 13/905,453

(22) Filed: May 30, 2013

(65) Prior Publication Data

US 2014/0354107 A1    Dec. 4, 2014

(51) Int. Cl.
*H02K 1/18* (2006.01)
*H02K 15/02* (2006.01)
*H02K 15/14* (2006.01)

(52) U.S. Cl.
CPC ............. *H02K 1/185* (2013.01); *H02K 15/02* (2013.01); *H02K 15/14* (2013.01); *Y10T 29/49009* (2015.01)

(58) Field of Classification Search
CPC .......... H02K 1/185; H02K 1/18; H02K 15/02; H02K 15/14
USPC ...................... 310/89, 216.113, 216.118, 129
See application file for complete search history.

(56) References Cited

U.S. PATENT DOCUMENTS

| | | | | |
|---|---|---|---|---|
| 1,033,379 A | * | 7/1912 | Burke | H02K 1/185 310/216.011 |
| 2002/0067086 A1 | | 6/2002 | Kikuchi et al. | |
| 2009/0212649 A1 | * | 8/2009 | Kingman | H02K 1/185 310/91 |
| 2010/0143113 A1 | * | 6/2010 | Itter | F01D 25/246 415/214.1 |
| 2011/0171887 A1 | * | 7/2011 | Tanimoto | B24B 23/028 451/359 |

FOREIGN PATENT DOCUMENTS

| | | |
|---|---|---|
| JP | 2009207252 | 9/2009 |
| WO | 2004062067 | 7/2004 |

* cited by examiner

*Primary Examiner* — Terrance Kenerly
(74) *Attorney, Agent, or Firm* — Quinn Law Group

(57) ABSTRACT

An electric motor assembly includes a housing and a stator. The housing includes an outer housing surface, an inner housing surface defining an interior housing cavity, and a plurality of housing protrusions extending from the inner housing surface. The stator is disposed in the inner housing cavity and includes an outer stator surface, an inner stator surface, and a plurality of stator protrusions extending from the outer stator surface toward the outer housing surface. The stator protrusions are configured to mate with the housing protrusions to frictionally couple the stator to the housing in order to fix the stator relative to the housing.

8 Claims, 2 Drawing Sheets

ELECTRIC MOTOR ASSEMBLY AND METHOD

TECHNICAL FIELD

The present disclosure relates to electric motor assemblies and methods of assembling an electric motor assembly in a vehicle powertrain.

BACKGROUND

Electric motors, such as those typically used in hybrid electromechanical powertrains for automotive vehicles, have a rotor and a stator surrounding the rotor. The rotor can rotate relative to the stator, and the stator is fixed to a stationary member, such as a transmission housing or casing. An air gap established by the radial clearance between the rotor and the stator. It is important to maintain the relative positions of the stator and the rotor in order to preserve the size of the air gap. However, maintaining relative positions of the stator and the rotor may be challenging because the rotor and stator relative positions are affected by manufacturing tolerances of all components in the air gap tolerance stack path. Additionally, the electric motor may be subjected to vibrations and mechanical shock. It is also important to maintain the position of the stator relative to the housing, both axially and radially, especially when the housing or the stator expand or contract due to thermal expansion.

SUMMARY

The present disclosure relates to electric motor assemblies. In an embodiment, the electric motor assembly includes a housing and a stator. The housing includes an outer housing surface, an inner housing surface defining an interior housing cavity, and a plurality of housing protrusions extending from the inner housing surface. The stator is disposed in the inner housing cavity and includes an outer stator surface, an inner stator surface, and a plurality of stator protrusions extending from the outer stator surface toward the outer housing surface. The stator protrusions are configured to mate with the housing protrusions to frictionally couple the stator to the housing in order to fix the stator relative to the housing.

In an embodiment, each of the stator protrusions includes a stator engaging surface. Each housing protrusion includes a housing engaging surface configured to contact one of the stator engaging surfaces to couple the housing to the stator. The housing defines a center, and the stator engaging surfaces face away from the center of the housing. The housing engaging surfaces face toward the center of the housing. The housing protrusions extend from the inner housing surface toward the center of the housing. Each stator protrusion has a variable height. The housing protrusions are radially spaced apart from one another. The stator protrusions are radially spaced apart from one another. The housing defines a top housing edge and a bottom housing edge opposite the top housing edge. At least one housing protrusion may be closer to the top housing edge than to the bottom housing edge. At least one housing protrusion may be closer to the bottom housing edge than to the top housing edge.

In an embodiment, the electric motor assembly includes a housing, a substantially annular stator, a rotor, and a support member. The housing includes an outer housing surface and an inner housing surface defining an interior housing cavity. The stator is disposed in the inner housing cavity and includes an outer stator surface and an inner stator surface opposite the outer stator surface. The inner stator surface defines an inner stator cavity. The stator includes a plurality of stator protrusions extending from the outer stator surface toward the outer housing surface. The rotor is disposed in the inner stator cavity. The support member is coupled between the rotor and the housing and includes a support body and a plurality of support protrusions extending from the support body. The support protrusions are disposed between the stator protrusions and the inner housing surface to frictionally couple the stator and the housing in order to fix the stator relative to the housing.

In an embodiment, each of the stator protrusions includes a stator engaging surface. Each support protrusion includes a support engaging surface configured to contact the stator engaging surfaces to couple the housing to the stator. The housing defines a center. Each stator engaging surface faces away from the center of the housing. Each support engaging surface faces toward the center of the housing. Each stator protrusion has a variable height. The support protrusions are radially spaced apart from one another. The stator protrusions are radially spaced apart from one another. The housing defines a top housing edge and a bottom housing edge opposite the top housing edge, and at least one support protrusion is closer to the top housing edge than to the bottom housing edge. At least one support protrusion is closer to the bottom housing edge than to the top housing edge.

The present disclosure also relates to a method of assembling an electric motor assembly. The method includes positioning a stator inside a housing. The housing defines a center and including an outer housing surface, an inner housing surface, and a plurality of housing protrusions extending from the inner housing surface toward the center of the housing. The stator includes a stator outer surface and a plurality of stator protrusions extending from the stator outer surface toward the outer housing surface. The method further includes rotating the stator relative to the housing until the stator protrusions mate with the housing protrusions to frictionally couple the stator to the housing.

The present disclosure relates to an electric motor assembly including housing with housing protrusions and a stator with stator protrusions configured to mate with the housing protrusions to fix the stator to the housing.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
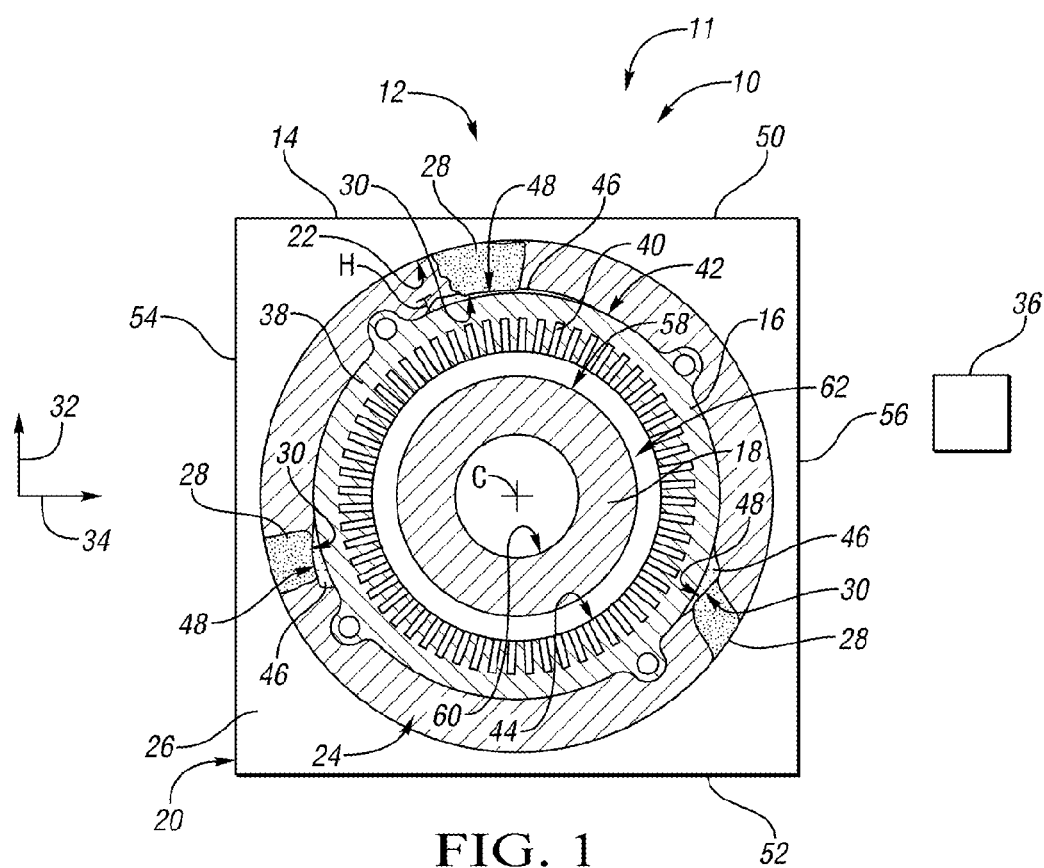
FIG. 1 is a schematic cross-sectional front view of an electric motor assembly including a housing, a stator, and a rotor.

Referring now to the drawings, wherein the like numerals indicate corresponding parts throughout the several views, FIG. 1 schematically illustrates a portion of an electrically-variable transmission 10 of a hybrid powertrain 11. The electrically-variable transmission 10 includes an electric motor assembly 12, which includes a housing 14, a substantially annular stator 16, and a rotor 18.

In motor design, it is important to reduce stack up tolerances in the electric motor assembly 12. Stack up tolerances refer to the accumulated variations of all tolerances of all the parts and the overall tolerance that relates to the alignment of the parts relative to one another. In the electric motor assembly 12, it is desirable to reduce the stack up tolerances in order to substantially align the housing 14, the stator 16, and the rotor 18 concentrically with one another. The presently disclosed electric motor assembly 12 includes supporting members (as discussed in detail below) for concentrically aligning the stator 16 with the housing 14 and the rotor 18, thereby precluding, or at least inhibiting, the stator 16 from tilting relative to the housing 14 and the rotor 18. It is important to concentrically align the stator 16 with the housing and the rotor 18 in order to have a substantially uniform air gap between the rotor 18 and the stator 16.

With continued reference to FIG. 1, the housing 14 contains the stator 16 and the rotor 18 and may serve as a motor and transmission housing or casing. Alternatively, the housing 14 may simply serve as a motor housing. The housing 14 includes a housing body 26 defining an outer housing surface 20 and an inner housing surface 22 opposite the outer housing surface 20. The inner housing surface 22 may define a substantially circular cross-section and defines the boundaries of an interior housing cavity 24. The inner housing cavity 24 may have a substantially circular shape along a plane 36 defined along a first or vertical direction indicated by arrow 32 and a second or horizontal direction indicated by arrow 34. Accordingly, the interior housing cavity 24 defines a center C. The interior housing cavity 24 may have a substantially cylindrical shape and is configured, shaped, and sized to receive the stator 16 and the rotor 18.

The housing 14 defines a first or top housing edge 50 and a second or bottom housing edge 52 opposite the first housing edge 50. The first housing edge 50 is spaced apart from the second housing edge 52 along the first direction indicated by arrow 32. The housing 14 additionally defines a third housing edge 54 (or first lateral edge) and a fourth housing edge 56 (or second lateral edge) opposite the third housing edge 54. The fourth housing edge 56 is spaced apart from the third housing edge 54 along the second direction indicated by arrow 34. The second direction, which is indicated by arrow 34, may be substantially perpendicular to the first direction indicated by arrow 32.

The housing 14 may be wholly or partly made of one or more non-ferrous materials, such as aluminum or magnesium alloy or plastic, in order to minimize the weight of the electric motor assembly 12 and to prevent electric and magnetic flow from the stator 16 to the housing 14. Furthermore, the housing 14 includes one or more housing protrusions 28 extending from the housing body 26. The housing protrusions 28 may be teeth and specifically protrude from the inner housing surface 22 toward the center C of the interior housing cavity 24. The housing protrusions 28 may also be referred to as housing support members and may be coupled to, or monolithically formed with, the housing body 26. Each housing protrusion 28 includes a housing engaging surface 30 configured to contact a portion of the stator 16 as discussed in detail below. Each housing engaging surface 30 may have a substantially curved shape and faces toward the center C of the interior housing cavity 24. Alternatively, the housing engaging surfaces 30 may be substantially flat or planar. Moreover, at least a portion of each housing engaging surface 30 may be obliquely angled relative to the first direction, which is indicated by arrow 32, or the second direction, which is indicated by arrow 34.

The housing protrusions 28 may be rotationally spaced apart from one another along the inner housing surface 22. In the depicted embodiment, the housing 14 includes three housing protrusions 28 that are 120 degrees apart from each other. The housing protrusions 28 may therefore be radially spaced apart from one another. Specifically, in the depicted embodiment, one housing protrusion 28 is closer to the first housing edge 50 than to the second housing edge 52, and the other two housing protrusions 28 are closer to the second housing edge 52 than to the first housing edge 50. Further, at least one housing protrusion 28 may be closer to the third housing edge 54 than to the fourth housing edge 56. Similarly, another housing protrusion 28 may be closer to the fourth housing edge 56 than to the third housing edge 54. It is contemplated, however, that the housing 14 may include more or fewer than three housing protrusions 28 arranged in different configurations.

Figure 3:
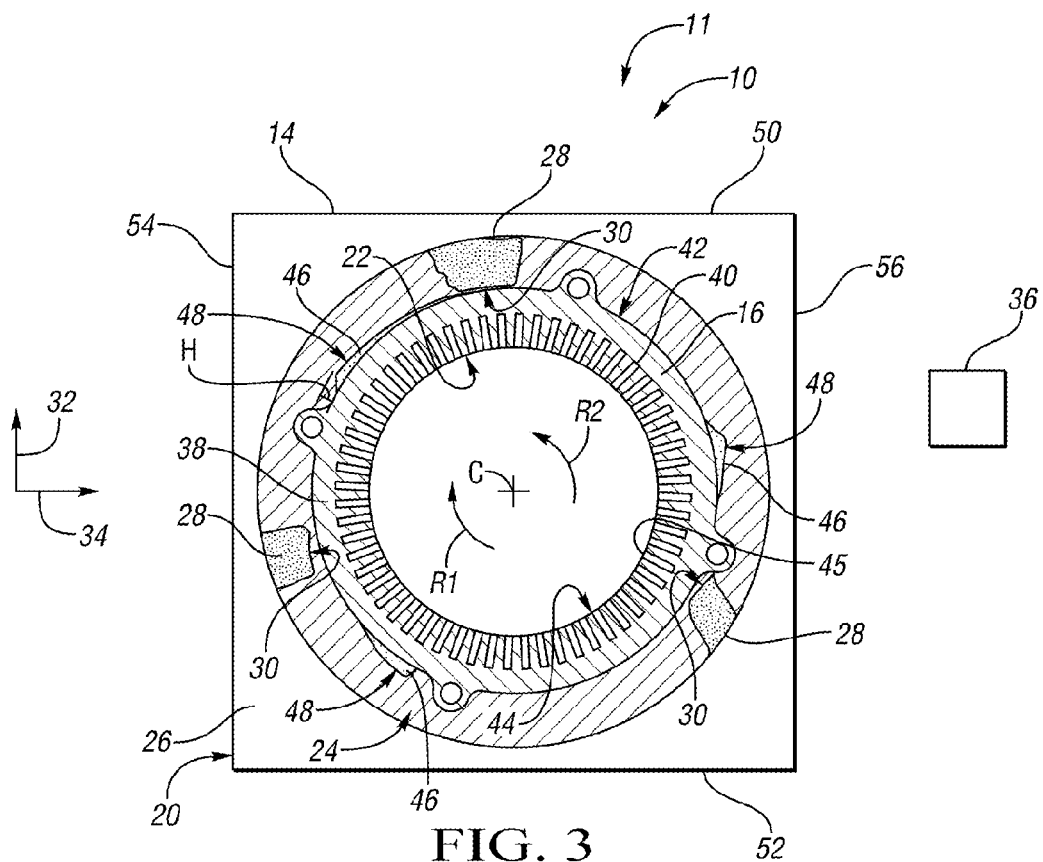
FIG. 3 is a schematic cross-sectional front view of the electric motor assembly of FIG. 1, showing the stator in a disengaged position.

The stator 16 is concentric with the housing 26 about the center C and has a substantially annular or toroidal shape. Moreover, the stator 16 includes a stator body 38 wholly or partly made of silicon steel or other suitable materials. The stator body 38 defines an outer stator surface 42 and an inner stator surface 44 opposite the outer stator surface 42 and may be comprised of a plurality of stacked laminations. The inner stator surface 44 defines an inner stator cavity 45 (FIG. 3). The stator 16 may be a glued stack of stamped silicon steel laminations. The stator 16 further includes a plurality of electrical conductors 40 annularly arranged in the stator body 38. The electrical conductors 40 may be bars or windings and are electrically connected to an electrical power source such as a battery or fuel cell. Moreover, the electrical conductors 40 are closer to the inner stator surface 44 than to the outer stator surface 42.

The stator 16 further includes a plurality of stator protrusions 46 extending from the stator body 38 in a direction away from the center C of the housing 14. The stator protrusions 46 may also be referred to as stator supporting members and may be coupled to, or monolithically formed with, the stator body 38. Moreover, the stator protrusions 46 may be radially spaced apart from one another and are configured to contact the housing protrusions 28 to frictionally couple the housing 14 to the stator 16. In the depicted embodiment, the stator protrusions 46 are configured to mate with the housing protrusions 28 to fix the stator 16 to the housing 14. Each of the stator protrusions 46 includes a stator engaging surface 48 configured to mate with a corresponding housing engaging surface 30 to fix the position of the housing 14 relative to the stator 16. The stator engaging surfaces 48 face away from the center C of the housing 14. The shape or profile of a stator engaging surface 48 may be complementary to shape or profile of a corresponding housing engaging surface 30. As such, when one stator engaging surface 48 is properly aligned with a corresponding housing engaging surface 30, the friction between the housing engaging surface 30 and the corresponding stator engaging surface 48 causes the stator 16 to be coupled to the housing 14, thereby fixing the position of the stator 16 relative to the housing 14.

In the depicted embodiment, the stator 16 includes three stator protrusions 46 that are arranged 120 degrees apart from each other. However, the stator 16 may include more or fewer than three stator protrusions 46. The number of stator protrusions 46 should correspond to the number of housing protrusions 28. When the stator 16 is coupled to the housing 14, at least one stator protrusion 46 may be closer to the first housing edge 50 than to the second housing edge 52, and at least one stator protrusion 46 may be closer to the second housing edge 52 than to the first housing edge 50. In addition, when the stator 16 is coupled to the housing 14, at least one stator protrusion 46 may be closer to the third housing edge 54 than to the fourth housing edge 56, and at least one stator protrusion 46 may be closer to the fourth housing edge 56 than to the third housing edge 54.

As discussed above, the electric motor assembly 12 further includes the rotor 18, which is concentrically aligned with the housing 14 and the stator 16 about the center C of the housing 14. The rotor 18 may have a substantially annular or toroidal shape and is configured to rotate about the center C when electric power is supplied to the electrical conductors 40. Further, the rotor 18 may be operatively connected to an engine or other power source. Consequently, the rotation of the rotor 18 can drive the engine (or other power source) when electric power is provided to the electrical conductors 40.

The rotor 18 defines an outer rotor surface 58 and an inner rotor surface 60 opposite the outer rotor surface 58. The outer rotor surface 58 and the inner stator surface 44 jointly define a gap 62 (such as an air gap) between them. In order to operate the electric motor assembly 12 effectively and consistently, the gap 62 should be substantially uniform along the length of the electric motor assembly 12. It is thus important to fix the position of the stator 16 with respect to the housing 14. To do so, the housing protrusions 28 are configured to mate with stator protrusions 46 in order to frictionally couple the housing 14 to the stator 16 such that the stator 16 is concentrically disposed with respect to the housing 14 about the center C. As a result, the stack up tolerances are reduced.

Figure 2:
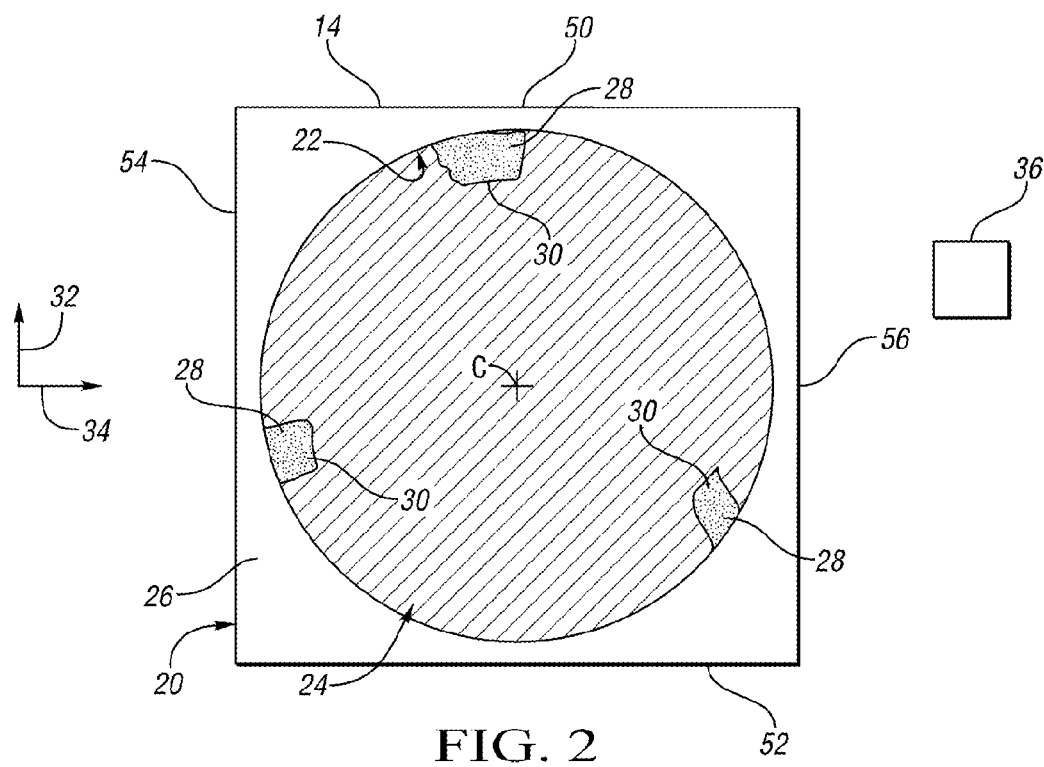
FIG. 2 is a schematic cross-sectional front view of the housing of the electric motor assembly of FIG. 1.

With reference to FIGS. 2 and 3, the present disclosure further relates to a method of assembling the electric motor assembly 12. The method begins by providing the housing 14 with the housing protrusions 28 as shown in FIG. 2. Subsequently, the stator 16 is positioned inside the housing 14 as shown in FIG. 3. Specifically, the stator 16 is disposed in the interior housing cavity 24 so that the stator protrusions 46 do not mate with the housing protrusions 28 as depicted in FIG. 3. The stator 16 is then rotated about the center C relative to the housing 14 in a first rotational direction, which is indicated by arrow R1, until the stator protrusions 46 frictionally engage the housing protrusions 28, thereby fixing the position of the stator 16 relative to the housing 14. For example, the stator 16 may be rotated about the center C until the stator protrusions 46 mate with the housing protrusions 28. In the depicted embodiment, each stator protrusion 46 has a variable height H that changes along a second rotational direction, which is indicated by arrow R2. For example, the height H of one or more stator protrusions 46 may increase along the second rotational direction indicated by arrow R2. Accordingly, gradually rotating the stator 16 about the center C of the housing 14 in the first rotational direction R1 causes one stator protrusion 46 to increasingly mate with a corresponding housing protrusion 28. Eventually, the stator protrusion 46 fully mates with a corresponding housing protrusion 28, thus fixing the stator 16 to the housing 14 as shown in FIG. 1. Then, the rotor 18 may be positioned inside the stator 16 as shown in FIG. 1. Next, a support member 63 (FIG. 4), such as a bearing support, is coupled between the housing 14 and the rotor 18 to interconnect the rotor 18, the stator 16, and the housing 14 as shown in FIG. 4.

Figure 4:
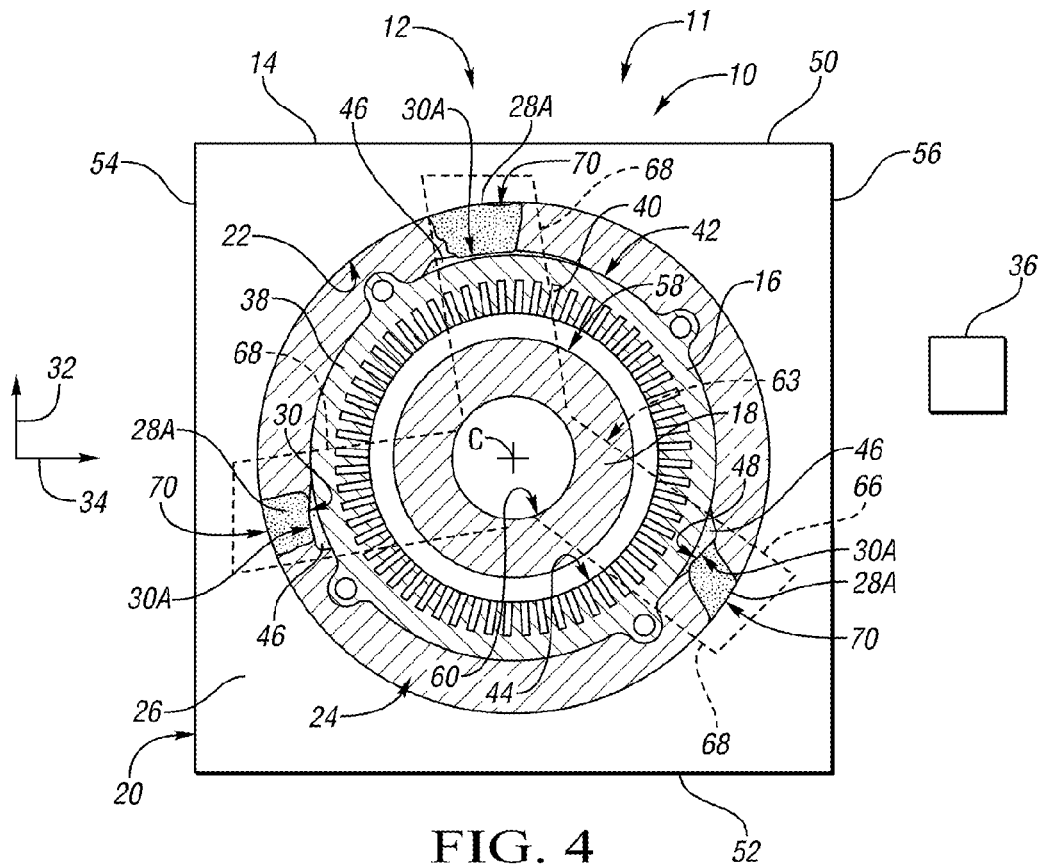
FIG. 4 is a schematic cross-sectional front view of an electric motor assembly in accordance with another embodiment of the present disclosure, wherein the electric motor assembly includes a stator, a rotor, a housing, and a support member.

With reference to FIG. 4, the electrical motor 12 may include support protrusions 28A in lieu of (or in addition to) the housing protrusions 28 (FIG. 1). The support protrusions 28A are part of the support member 63 (e.g., bearing support member) and are configured to couple the rotor 18 to the housing 14. The support member 63 includes a support body 66. The support body 66 may include one or more arms 68 configured to couple the housing 14 to the rotor 18. The support member 63 may further include support protrusions 28A protruding from the support body 66. For example, in the depicted embodiment, the support protrusions 28A may extend from one or more arms 68 at least in a direction substantially perpendicular to the first direction indicated by arrow 32 and the second direction indicated by arrow 34. The structure and operation of the support protrusions 28A are substantially similar or identical to the housing protrusions 28 (FIG. 1). Accordingly, the support protrusions 28A are configured to mate with the stator protrusions 46 to frictionally couple the stator 16 between the housing 14 and the rotor 18. For instance, each support protrusion 28A includes a support engaging surface 30A that is identical or substantially similar to the housing engaging surface 30 (FIG. 1) described above. In addition to the support engaging surface 30A, each support protrusions 28A includes a support coupling surface 70 opposite to the support engaging surface 30. The support coupling surfaces 70 of each support protrusion 28A are configured to mate with the inner housing surface 22 to couple the support member 63 to the stator 16, and the support body 66 may be rotated relative to the housing 14 and stator 16 to engage support protrusions 28A with stator protrusions 46.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An electric motor assembly, comprising:
   a housing including an outer housing surface, an inner housing surface defining an interior housing cavity, and a plurality of housing protrusions extending from the inner housing surface;
   a stator disposed in the interior housing cavity, the stator including an outer stator surface, an inner stator surface, and a plurality of stator protrusions extending from the outer stator surface toward the outer housing surface;
   wherein the stator protrusions are configured to mate with the housing protrusions to frictionally couple the stator to the housing in order to fix the stator relative to the housing;
   wherein each of the stator protrusions includes a stator engaging surface, and each of the housing protrusions includes a housing engaging surface configured to contact one of the stator engaging surfaces to couple the housing to the stator; and
   wherein the housing defines a center, and the stator engaging surfaces face away from the center of the housing, and a shape of the stator engaging surface is complementary to a shape of the housing engaging surface such that, when the stator engaging surface is aligned with the housing engaging surface, a friction between the housing engaging surface and the stator engaging surface causes the stator to be coupled to the housing, thereby fixing a position of the stator relative to the housing.

2. The electric motor assembly of claim 1, wherein the housing engaging surfaces face toward the center of the housing, and each of the stator protrusions has a variable height that increases along a first rotational direction such that gradually rotating the stator about the center of the housing in a second rotational direction, which is opposite to the first rotational direction, causes the stator protrusions to increasingly mate with the housing protrusions to eventually fix the position of the stator relative to the housing.

3. The electric motor assembly of claim 1, wherein the housing protrusions extend from the inner housing surface toward the center of the housing.

4. The electric motor assembly of claim 1, wherein each stator protrusion has a variable height.

5. The electric motor assembly of claim 1, wherein the housing protrusions are circumferentially spaced apart from one another.

6. The electric motor assembly of claim 1, wherein the stator protrusions are circumferentially spaced apart from one another.

7. The electric motor assembly of claim 1, wherein the housing defines a top housing edge and a bottom housing edge opposite the top housing edge, and at least one housing protrusion is closer to the top housing edge than to the bottom housing edge.

8. The electric motor assembly of claim 7, wherein at least one housing protrusion is closer to the bottom housing edge than to the top housing edge.

* * * * *